June 20, 1950 P. L. F. JONES 2,512,279
GYROSCOPICALLY-CONTROLLED INSTRUMENT
Filed Oct. 1, 1948
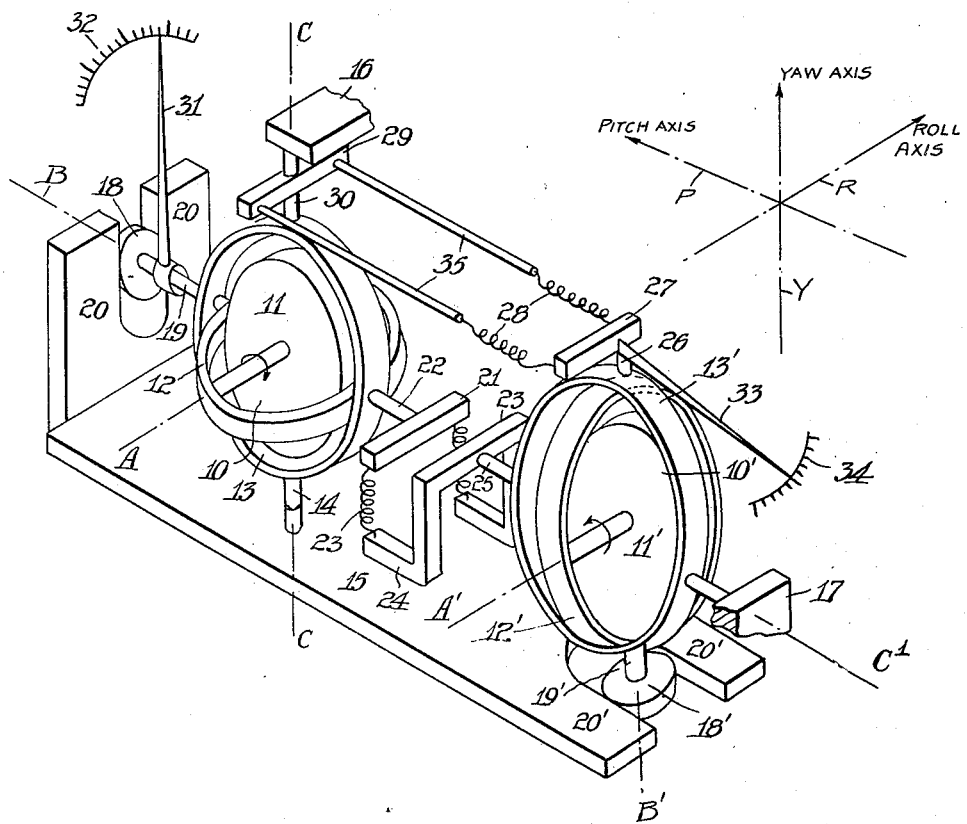
INVENTOR
PATRICK LUDLOW FLEMING JONES
BY
Richardson + David
his ATTORNEY Patented June 20, 1950

2,512,279

UNITED STATES PATENT OFFICE 2,512,279

GYROSCOPICALLY-CONTROLLED INSTRUMENT

Patrick Ludlow Fleming Jones, Wells, England, assignor to Scophony Limited, London, England, a British company Application October 1, 1948, Serial No. 52,175
In Great Britain October 3, 1947

10 Claims. (Cl. 74—5.34)

The present invention relates to gyroscopically-controlled instruments of the character set forth in the specification of my patent application Serial No. 766,005, filed August 4, 1947.

In the earlier specification, there is described a gyroscopic instrument suitable for use for example for indicating rate of turn in aircraft or other vessels. As described in the earlier specification, a gyroscopic element is mounted in such a manner that it, and its axis of rotation A, are capable of movement in gimbal rings about two axes B and C perpendicular to one another, and usually also to the axis A. A first friction member (usually a wheel having a cylindrical surface) rotates in accordance with rotary movements of one of the gimbal rings (the inner) about the axis B and when displaced engages one or other of two fixed friction cheeks. The axis C is the one about which the rate of turn to be measured is applied, any rate of turn about the axis A having no effect, this axis being that about which the gyroscope element or rotor rotates.

It has, however, been found that if a rate of turn about the axis B is also present, there is set up between the friction member which rotates with the inner gimbal ring and one or other of the two friction cheeks with which it co-operates, a radial force, with respect to the axis B, which is proportional to the rate of turn about the axis B, and consequently interferes with the proper functioning of the damping system, and may lead to incorrect readings of the pointer which indicates rotation about the axis C. Such errors may take the form of over- or under-damping or sticking of the pointer.

In one application of the earlier invention which was envisaged, it was proposed to mount two of the units above referred to in an aircraft for the purpose of measuring rates of turn about the pitch and yaw axes respectively and for this purpose it was proposed that in one of these units the axis A should be disposed so as to be normally parallel to the pitch axis of the aircraft, the axis B being parallel to the roll axis, and that in the other of the units, the axis A should be disposed so as to lie normally parallel to the yaw axis whilst the axis B should again be disposed parallel to the roll axis. In this way it was arranged that for small deflections of the axes A from their positions corresponding to zero rate of turn, their readings would be independent of one another, that is to say, the rate of pitch would not affect the readings of rate of yaw, and vice versa. However, it will be seen that rotation of the aircraft about the roll axis will introduce in both instruments the undesirable static forces in the damping system described above.

The present invention has for its object to provide a gyroscopically-controlled instrument suitable for indicating rates of turn in two mutually perpendicular directions, in which the above difficulty is removed or reduced.

According to the present invention, therefore, in a gyroscopically-controlled instrument for indicating rates of turn in two mutually perpendicular directions, there are provided two gyroscope devices, each having a gyroscopic element mounted upon a frame by means of inner and outer gimbal rings, which permit limited rotary movement of the element and its axis of rotation A about two mutually perpendicular axes B and C, and having means for indicating, or producing a controlling effect in response to, rotary movements of the inner gimbal ring, each of the devices also having a first friction member mounted for rotation in accordance with rotary movements of the inner gimbal ring and having its axis displaceable with the axis B of the inner gimbal ring, the first of these friction members co-operating with two friction members on the frame, but being out of contact therewith excepting when the instrument is given angular acceleration around the axis C of movement of the outer gimbal ring, or when the inner ring is oscillated about the axis of rotation B, the instrument being characterised by the fact that the two gyroscopic devices are arranged with their axes A parallel to one another and means are provided for transmitting to the outer gimbal ring of one of the devices a torque about its axis C, this torque varying in dependence upon movement of the inner gimbal ring of the other of the devices about its axis B, and for transmitting to the outer gimbal ring of the said other of the devices a torque about its axis C, this torque varying in dependence upon movement of the inner gimbal ring of the first of the said devices about its axis B.

The invention will be described with reference to the accompanying drawing which shows diagrammatically and in perspective one embodiment thereof.

The arrangement shown is intended for use in an instrument for indicating the rate of yaw and pitch, in an aircraft for example. It comprises two gyroscopic devices 10 and 10'. Parts of the device 10' corresponding to those in the device 10 will be given the same references as in the parts of device 10 but with a dash superscript. The devices each include a gyroscopic element or rotor 11 or 11' rotatable about an axis A or A' in an inner gimbal ring 12 or 12' which is capable of limited rotary movement about an axis B or B' in an outer gimbal ring 13 or 13', the outer ring 13 or 13' being capable of limited rotary movement about an axis C or C'. Rotary movement of the outer ring 13 about the axis C is permitted by a spindle 14 rotatably mounted at its lower end in the frame 15 which is fixed to the aircraft and at its upper end in an extension 16 of the frame. Rotary motion of the outer ring 13' about the axis C' is permitted by a spindle 14' rotatably mounted in an extension 17 of the frame.

The devices 10 and 10' each have a friction member or wheel 18 or 18' which are shown as fixed upon a spindle 19 or 19', which is fixed to the inner gimbal ring 12 or 12'. They could, if preferred be otherwise coupled to the rings 12 and 12', for instance by gearing. Each of these friction members is located between two friction blocks 20 or 20' fixed to the frame 15 and sufficiently spaced apart just to permit rotary movement of the member 18 or 18' without contact therewith. A member 21 fixed to a spindle 22 which is fixed to the inner gimbal ring 12 is coupled by springs 23 to a member 24 fixed to a spindle 25 which is fixed to the outer gimbal ring 13'. This permits the transmission to the outer gimbal ring 13' of a torque about its axis C', this torque varying in dependence upon the movement of the inner gimbal ring 12 about its axis B. The inner gimbal ring 12' is fixed to a spindle 26 carrying a member 27 coupled by light rods or wires 35 and springs 28 to a member 29 fixed to a spindle 30 which is connected to the outer gimbal ring 13. This permits the transmission to the outer gimbal ring 13 of a torque about its axis C, this torque varying in dependence upon the movement of the inner gimbal ring 12' about its axis B'.

It is to be noted that the axes A and A' of rotation of the two gyroscopic elements 11 and 11' are arranged parallel to one another and to the roll axis R. The device 10 is intended to indicate the rate of yaw, that is the rate of movement about the yaw axis Y. The device 10' is to indicate the rate of pitch, namely the rate of movement about the pitch axis P. Indication of rate of yaw is given by a pointer 31 fixed to the spindle 19 (that is to the friction member 18) and co-operating with a scale 32 and indication of the rate of pitch is given by a pointer 33 fixed to the spindle 26 (that is to the friction member 18') and co-operating with a scale 34, the scales 32 and 34 being fixed to the frame 15. The axes B and C' are arranged parallel to the pitch axis P and the axes C and B' are arranged parallel to the yaw axis Y.

The yielding coupling 22, 23, 24 is more complicated than the yielding coupling 27, 28, 35, 29 because in the former case the spindles 22 and 25 to be coupled are co-linear. This is usually the preferred arrangement but if desired the spindles may be disposed mutually coplanar, and parallel to one another in which case a simpler yielding coupling can be provided between them.

The mode of operation of the arrangement described is as follows:

Considering the gyroscope device 10 and assuming that its rotor 11 is spinning, the effect of an angular acceleration about the axis C owing to yaw is to bring the wheel 18 into contact with one or other of the blocks 20 so that one of these blocks exerts a torque on the wheel 18, and hence on the outer and inner rings 12 and 13, about the axis C thus causing the gyroscope to begin precessing about the axis B. This movement about the axis B results in torque being applied to the outer ring 13' of the device 10' through the coupling 22, 23, 24. The extent of the precession is indicated at 31, 32. The effect of the mechanical coupling, with respect to rotation about the axis B, between the devices 10 and 10' is to produce on the ring 12 a restoring torque which makes the deflection of this ring about the axis B substantially proportional to the rate of yaw and also to exert a "holding-off" force on the wheel 18' of the device 10', this force being substantially equal and opposite to that produced directly on this wheel by the given rate of yaw.

The functioning of the device 10' in the presence of acceleration around the axis C' parallel to the pitch axis is analogous to that described for acceleration about the yaw axis.

I claim:

1. A gyroscopically-controlled instrument for indicating rates of turn in two mutually-perpendicular directions, said instrument comprising a frame; two gyroscopic devices each having a rotor rotatable about a first axis, and supported upon inner and outer gimbal rings for limited rotary movement of said rotor about a second and a third axis respectively, said second and third axes being mutually perpendicular and inclined relatively to said first axis, means responsive to rotary movements of said inner gimbal ring about said second axis and a friction member actuated in response to movements of said inner gimbal ring about said second axis, said first axes being parallel to one another, friction means fixed to said frame to engage said friction members, respectively, and means for transmitting torque about said third axes from the outer gimbal ring of each of said devices to the inner gimbal ring of the other of said devices.

2. An instrument according to claim 1, wherein said first axes are substantially perpendicular to said second and third axes in the absence of acceleration of said frame.

3. An instrument according to claim 1, wherein said second and third axes of one of said devices are disposed perpendicular to said second and third axes, respectively, of the other of said devices.

4. An instrument according to claim 1, wherein said torque-transmitting means comprise yielding couplings.

5. An instrument according to claim 4, wherein said yielding couplings are constituted by springs.

6. An instrument according to claim 1, wherein said friction members are cylindrical and said friction means are disposed to engage the cylindrical surfaces of said members upon diametrically opposite sides thereof.

7. An instrument according to claim 1, wherein said friction members are fixed to said inner gimbal rings respectively.

8. A gyroscopically-controlled instrument for indicating rates of turn in two mutually-perpendicular directions, said instrument comprising two gyroscope rotors mounted upon inner gimbal rings for rotation about substantially parallel axes, an outer gimbal ring supporting each of said inner gimbal rings for rotation about a second axis, a frame, means for supporting each of said outer gimbal rings for rotation relatively to said frame about a third axis, said second and third axes associated with one outer gimbal ring being perpendicular to said second and third axes, respectively, associated with the other outer gimbal ring, a friction wheel mounted for rotation with each of said inner gimbal rings, friction blocks fixed to said frame and disposed to engage said friction wheels respectively upon limited rotation in both senses of said outer gimbal rings about said third axes, and a torque-transmitting coupling between the outer gimbal ring associated with each of said rotors and the inner gimbal ring associated with the other of said rotors respectively, said torque-transmitting coupling being capable of transmitting torque about said third axes respectively.

9. An instrument according to claim 8, wherein said couplings include springs to render the couplings yielding.

10. An instrument according to claim 8, wherein said friction wheels are fixed to said inner gimbal rings respectively.

PATRICK LUDLOW FLEMING JONES.

REFERENCES CITED

The following references are of record in the file of this patent:

UNITED STATES PATENTS

| Number | Name | Date |
|---|---|---|
| 1,066,860 | Sparman | July 8, 1913 |
| 1,446,348 | Hort | Feb. 20, 1923 |
| 2,199,294 | Seligmann | Apr. 30, 1940 |
| 2,395,250 | Carlson | Feb. 19, 1946 |